United States Patent
Jeon et al.

(10) Patent No.: US 10,234,028 B2
(45) Date of Patent: Mar. 19, 2019

(54) SHIFT BY WIRE TRANSMISSION SHIFT CONTROL SYSTEM

(71) Applicant: Dura Operating, LLC, Auburn Hills, MI (US)

(72) Inventors: Jinseok Jeon, LaSalle (CA); Brian D. Howe, Shelby Township, MI (US); Yang Soo Cho, LaSalle (CA)

(73) Assignee: Dura Operating, LLC, Auburn Hills, MI (US)

( * ) Notice: Subject to any disclaimer, the term of this patent is extended or adjusted under 35 U.S.C. 154(b) by 238 days.

(21) Appl. No.: 14/971,224

(22) Filed: Dec. 16, 2015

(65) Prior Publication Data

US 2017/0175885 A1 Jun. 22, 2017

(51) Int. Cl.
  *F16H 61/28* (2006.01)
  *F16H 63/28* (2006.01)
  *F16H 61/32* (2006.01)

(52) U.S. Cl.
  CPC ............. *F16H 61/32* (2013.01); *F16H 61/28* (2013.01); *F16H 63/28* (2013.01); *F16H 2061/2892* (2013.01)

(58) Field of Classification Search
  CPC ..... F16H 2061/2892; F16H 2061/1272; F16H 2061/1292; F16H 2061/1296
  See application file for complete search history.

(56) References Cited

U.S. PATENT DOCUMENTS

| | | |
|---|---|---|
| 4,463,628 A | 8/1984 | Ahlschwede et al. |
| 6,484,598 B2 | 11/2002 | Peter |
| 6,918,314 B2 | 7/2005 | Wang |
| 7,241,244 B2 | 7/2007 | Wang |
| 7,354,372 B2 | 4/2008 | Wang |

(Continued)

FOREIGN PATENT DOCUMENTS

| | | |
|---|---|---|
| DE | 102012025096 A1 | 6/2014 |
| JP | 2008-180250 | 8/2008 |
| JP | 2010-151302 | 7/2010 |

OTHER PUBLICATIONS

Glatz, Karl-Heinz. Machine Translation of DE102012025096 Drive unit. Jun. 26, 2014. Espacenet.*

(Continued)

*Primary Examiner* — Jacob S. Scott
*Assistant Examiner* — Lori Wu
(74) *Attorney, Agent, or Firm* — Reising Ethington P.C.; Matthew J. Schmidt; Robert E. Ford

(57) ABSTRACT

A gear shift control system may include an output mechanism, first and second drive members and a drivetrain. The first drive member may be coupled to the output mechanism to drive the output mechanism and cause a transmission shift. The drivetrain includes a first input driven by the drive member during a first mode of operation and an output coupled to both the first input and the output mechanism to drive the output mechanism as commanded by the drive member. During a second mode of operation a second input is coupled to the output and a second drive member is coupled to the second input to drive the output mechanism through the second input and the output to cause a transmission gear shift. The second drive member may be laterally offset from the drivetrain and axially positioned within an axial height of the drivetrain.

7 Claims, 2 Drawing Sheets

(56) References Cited

U.S. PATENT DOCUMENTS

| | | |
|---|---|---|
| 8,336,418 B2 | 12/2012 | Giefer et al. |
| 8,413,784 B2 | 4/2013 | Giefer et al. |
| 8,499,661 B2 | 8/2013 | Rake et al. |
| 8,560,193 B2 | 10/2013 | Krishnaswami et al. |
| 8,936,524 B2 | 1/2015 | Howe et al. |
| 2002/0045506 A1 | 4/2002 | Scheuerer |
| 2003/0221499 A1 | 12/2003 | Wong |
| 2009/0217782 A1 | 9/2009 | Wang |
| 2009/0326767 A1 | 12/2009 | Kamada et al. |
| 2011/0126657 A1* | 6/2011 | Ganter .................... F16H 61/12 74/473.12 |
| 2011/0138532 A1 | 6/2011 | Lin |
| 2013/0305865 A1 | 11/2013 | Howe |

OTHER PUBLICATIONS

EP Extended Search Report for EP Application No. 16202054.9 dated Mar. 27, 2017 (15 pages).
Photo of what is understood to be a Siemens' Actuator for a Mercedes Vehicle.
Written Opinion & International Search Report for PCT/US13/41179 dated Aug. 26, 2013, 11 pages.
EP Office Action for EP Application No. 16202054.9 dated Mar. 22, 2018 (6 pages).

\* cited by examiner

SHIFT BY WIRE TRANSMISSION SHIFT CONTROL SYSTEM

TECHNICAL FIELD

The present disclosure relates generally to a gear shift system for a vehicle transmission.

BACKGROUND

In some vehicles, a gear shift lever in a passenger compartment of the vehicle can be moved by an operator of the vehicle to shift the vehicle transmission between its park gear and other gears, such as reverse, neutral and forward drive gears. The shift lever is mechanically coupled to the transmission through a cable that transmits the shift level movement to a transmission shift mechanism. Other vehicles use a so-called "shift-by-wire" system wherein an operator shift lever or shift control unit is not physically coupled to the transmission shift mechanism by a cable. Instead, the shift control unit is electrically coupled to a shift actuator that is arranged to shift the transmission upon receipt of a signal from the shift control unit that a transmission gear shift is desired by the operator. If electrical power is lost to the vehicle, or to the electrical circuit of the vehicle from which electricity is supplied to the shift-by-wire system, then the ability of the operator to control shifting of the transmission via the shift control unit is also lost.

SUMMARY

In at least some implementations, a gear shift control system includes an output mechanism, first and second drive members and a drivetrain. The output mechanism may be coupled to a vehicle transmission, and the first drive member is coupled to the output mechanism to drive the output mechanism to shift between gears of the transmission. The drivetrain interconnects the first drive member and the output mechanism and includes a first input driven by the drive member during a first mode of operation and an output coupled to both the first input and the output mechanism to drive the output mechanism as commanded by the drive member. During a second mode of operation a second input is coupled to the output. The second drive member is coupled to the second input to drive the output mechanism through the second input and the output during said second mode of operation to cause a transmission gear shift. The second drive member is laterally offset from the drivetrain and axially positioned within an axial height of the drivetrain.

In some embodiments, the second drive member includes a return spring providing a force on the second input tending to drive the second input in a direction that would shift the vehicle transmission to its park gear, the return spring being laterally offset from a periphery of the ring gear and fixed to the ring gear by a coupler. The coupler may extend between and transmit force between the return spring and the second input. The coupler may be substantially inextensible and transmit force between the second drive member and the second input without lost motion between them. The coupler may have a first portion connected to the return spring and a second portion coupled to the ring gear, the ring gear may include a cavity and the second portion may include a projection adapted to be received within the cavity.

A retainer and an actuator to release the retainer may be provided to selectively hold the second input during the first mode of operation. A power storage device may be coupled to the release mechanism and provide a stored reserve of electrical power that may be used to actuate the release mechanism in the second mode of operation. The power storage device may include a capacitor that stores a charge that may be provided to the release mechanism, so that the release may be actuated independently of any power supply to the first drive member or otherwise within the vehicle.

In at least some implementations, a gear shift control system includes a first drive member including an electric motor, an output shaft coupled to a vehicle transmission and to the first drive member to be driven for rotation by the first drive member, a planetary gear set and a return spring. The gear set is coupled to the first drive member and the output shaft, and has three intermeshed gear elements including a ring gear, a sun gear and at least one planet gear. A first gear element is coupled to the first drive member and is driven for rotation by the first drive member, and a second gear element is coupled to the output shaft for rotation with the output shaft. The return spring is offset from an axis of and coupled to a third gear element to drive the output shaft through the third gear element and the first gear element. In a first mode of operation, the transmission is shifted between park and other gears by causing the first drive member to rotate the output shaft through the second gear element and the first gear element when a transmission gear shift is desired. During a second mode of operation, the transmission is shifted to park by the return spring which drives the output shaft through the third gear element and first gear element.

A gear shift control system, in at least some implementations, may include a first drive member, a drivetrain, a return spring, a retainer, a release, an actuator coupled to the release and a power supply for the actuator. The first drive member may be adapted to be coupled to an output of a transmission to drive the output to shift between gears of the transmission. The drivetrain has a plurality of gears rotatable about an axis, the drivetrain interconnects the first drive member to the output and is driven by the first drive member to cause a transmission gear shift during a first mode of operation of the gear shift control system. The return spring is radially offset from the drivetrain axis, coupled to the drivetrain and axially positioned within an axial height of the drivetrain. The return spring is selectively coupled to the output via the drivetrain and the drivetrain is driven by the return spring to cause a transmission gear shift during a second mode of operation of the gear shift control system. The retainer that prevents the return spring from driving the drivetrain during the first mode of operation may be released by the actuator so that the return spring can drive the drivetrain in the second mode of operation. The power supply is coupled to the release and stores a reserve of electrical power that is used to power the actuator.

BRIEF DESCRIPTION OF THE DRAWINGS

The following detailed description of preferred implementations and best mode will be set forth with regard to the accompanying drawings, in which.

DETAILED DESCRIPTION OF PREFERRED EMBODIMENTS

Figure 1:
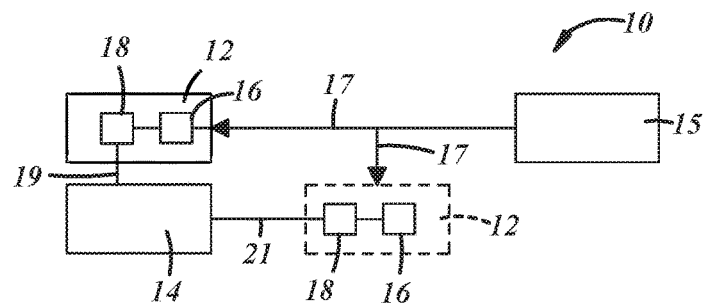
FIG. 1 is a partial perspective view of a transmission including a shifting system actuator.
Figure 3:
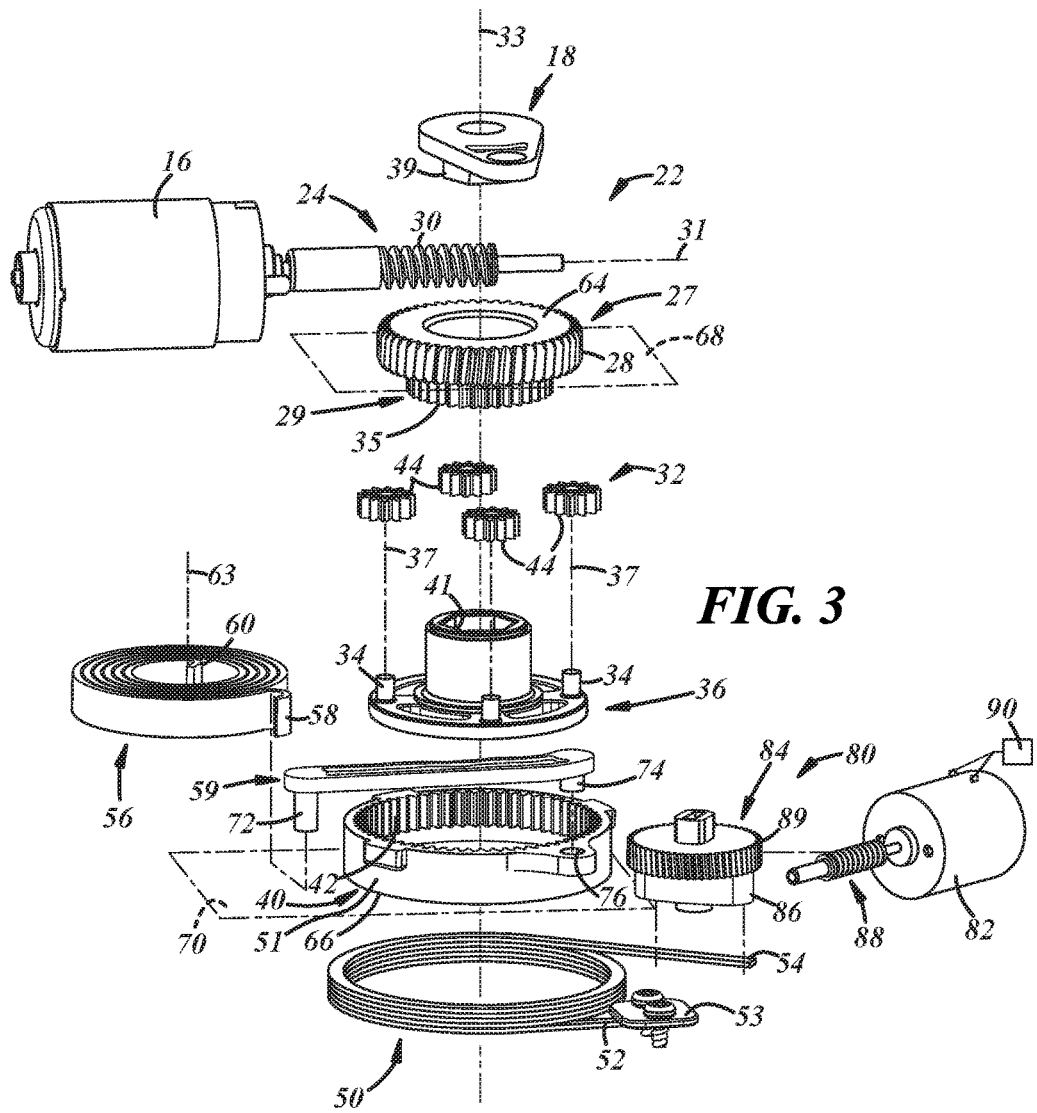
FIG. 3 is an exploded view of the actuator
Figure 2:
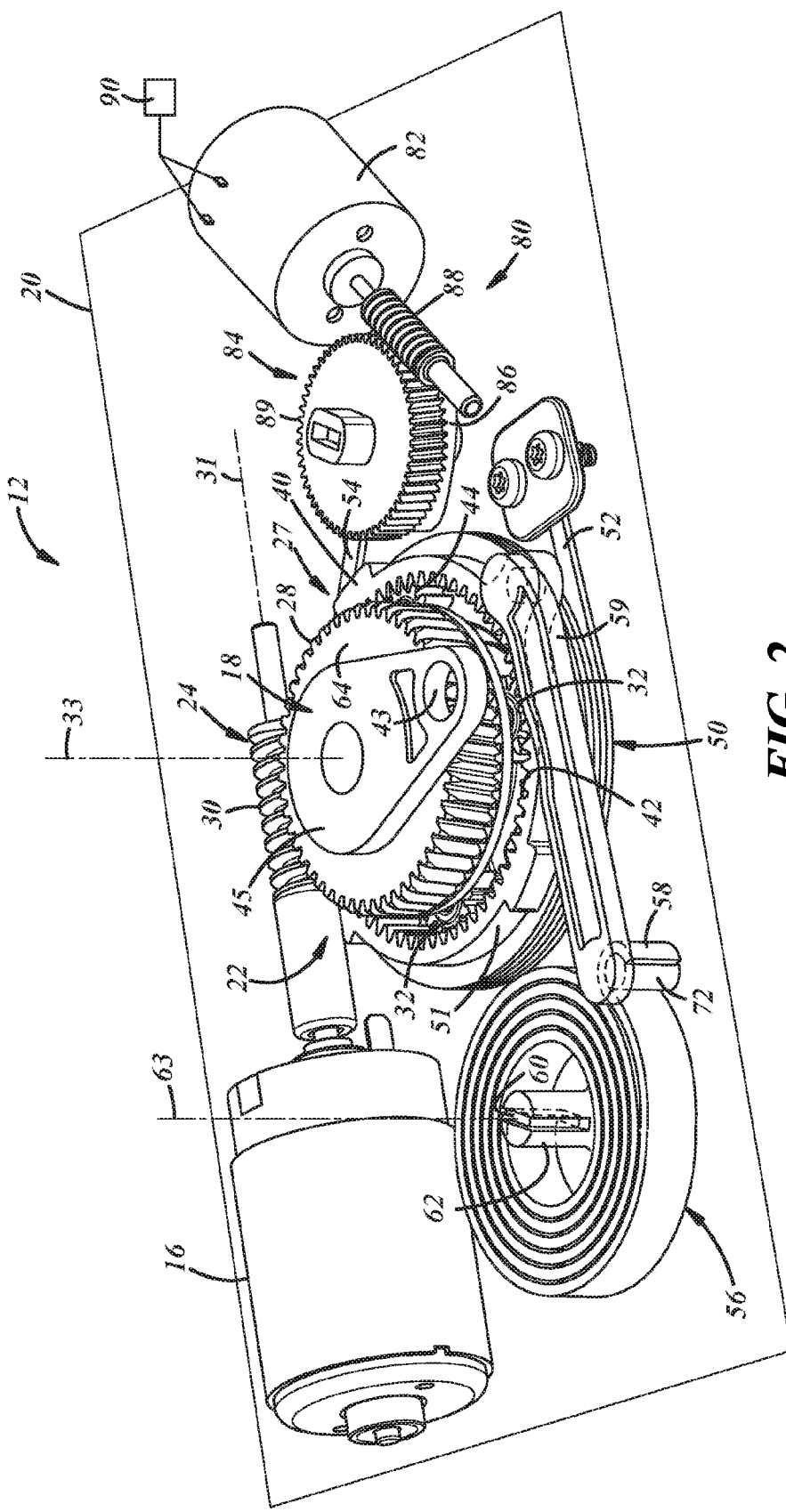
FIG. 2 is a perspective view of the actuator shown without a housing in which the actuator may be mounted.

Referring in more detail to the drawings, FIGS. 1-3 show a transmission shifting system 10 including an actuator 12 that is controlled by an operator of a vehicle to command a gear shift of a transmission 14, for example to shift the transmission among and between park, neutral, reverse and forward drive gears. The shifting system 10 may be part of a so-called "shift by wire" system where an operator command for a gear shift (e.g. by turning a rotary shifting knob or moving a lever or other gear shifter 15) is transmitted to an electric motor 16 of the actuator 12 (e.g. as an electrical signal 17 represented on FIG. 1), and the motor 16 drives an output mechanism, such as an output coupler or shaft 18, of the actuator 12 that is coupled to a shift mechanism to shift among the transmission gears. The output mechanism may be any device or component that may couple, directly or indirectly, the actuator to a shift mechanism of the transmission. FIG. 1 shows two positions for the actuator 12, one in solid lines and one in dashed lines. In one position, the actuator may be directly connected to the transmission 14 (e.g. output 18 may be directly linked (represented as 19 in FIG. 1) to a shift mechanism of the transmission) and in the other position the output 18 of the actuator 12 is coupled to the transmission shift mechanism by a cable 21. Thus, the actuator 12 may conveniently be positioned on or remotely from the transmission 14 and may be used in a wide range of applications.

Should electric power be lost in the vehicle, or at least in an electrical circuit of the vehicle electric system that includes the motor 16, then the ability of the vehicle operator to control shifting of the vehicle transmission may also be lost. In this situation, it may be desirable to shift the transmission 14 into park so that any motion of the vehicle can be stopped and further motion prevented until the electric power is restored to the actuator motor 16.

As shown in FIGS. 1 and 2, the actuator 12 may include a housing 20, which is shown in FIG. 2 without a cover to expose internal components. The actuator may also include a main drive element that, through a drivetrain 22, drives the output shaft 18 to shift the transmission 14. The actuator may be mounted on the transmission 14 as generally shown in FIG. 1, or may be located spaced from the transmission and connected to a shift mechanism of the transmission by a cable or other intermediate member, if desired. In at least some implementations, the actuator 12 is compact or relatively small in size and may be received between a shift lever actuated by the vehicle driver and the transmission, within a transmission tunnel defined between the transmission and adjacent interior vehicle surfaces, or elsewhere as desired.

The main drive element may be any device capable of causing a shift of the transmission in response to an operator of the vehicle's request. The drivetrain may be any device or devices that interface with the main drive element and the transmission to facilitate shifting the transmission. In at least one implementation, the main drive element includes the electric motor 16 and a drive gear 24, shown here as a worm that is rotated by the motor. The worm 24 in this implementation is meshed with a first input of the drivetrain 22, which, in this implementation, is shown as a worm gear 27 having external teeth 28 that mesh with teeth 30 on the worm 24. Further, in the implementation shown, the drivetrain 22 includes a planetary gear set and the first input includes a sun gear 29 that is coupled to the worm gear 27. Accordingly, rotation of the worm 24 causes rotation of the worm gear 27 and sun gear 29. In this example, the worm 24 rotates about an axis 31 and the sun gear 29 is rotated about an axis 33 substantially perpendicular to the worm axis 31.

As shown in FIG. 3, the sun gear 29 includes teeth 35 adapted to be meshed with an output 32 of the drivetrain 22.

In the implementation shown, the output 32 includes one or more planet gears meshed with the sun gear 29 so that rotation of the sun gear 29 causes rotation of the planet gears 32. The planet gears 32 are carried for rotation about shafts or pins 34 that are connected to a carrier 36. The planet gears 32 rotate about axes 37 that are parallel to each other, and parallel to the sun gear axis of rotation 33. In the implementation shown four planet gears 32 are provided, although any desired number may be used. The carrier 36, in turn, is coupled to the output shaft 18 for co-rotation of the carrier 36 and output shaft 18. In the implementation shown, the output shaft 18 includes a portion 39 with a noncircular profile that is received within a complementarily shaped cavity 41 of the carrier 36 so that these components rotate together. The carrier 36 and output shaft 18 may be coaxial with the sun gear 29 and rotate about the same axis 33. In use, rotation of the carrier 36 moves the planet gears 32 around the sun gear 29 and causes rotation of the output shaft 18. In at least some examples, the output shaft 18 may be coupled to the shift mechanism at an opening 43 in a lever portion or radial extension 45 of the output shaft 18. The extension 45 may also be coupled to a cable to drive the shift mechanism when the actuator is located remotely from the shift mechanism.

As best shown in FIG. 3, the planet gears 32 are also meshed with a second input 40 of the drivetrain 22. The second input, in the implementation shown, includes a ring gear 40 having inwardly extending teeth 42 meshed with complementary teeth 44 of the planet gears 32. During a normal or first mode of operation of the actuator 12 in which the gears of the transmission 14 are shifted as commanded by an operator of the vehicle, the planet gears 32 move relative to the ring gear 40 about the inner circumference of the ring gear 40, and the ring gear is held so that it does not rotate. In at least one implementation, the ring gear 40 is held against rotation by a retainer 50.

The retainer 50 may be any device capable of inhibiting or preventing rotation of the ring gear, and it may be releasable to selectively permit rotation of the ring gear 40 in the second direction during a second mode of operation. In at least one implementation, the actuator's second mode of operation causes the transmission 14 to be shifted to park when electric power to the motor 16 is lost. During this second mode of operation, the retainer 50 is released (e.g. the force of the retainer 50 on the ring gear 40 is reduced or removed) so that the ring gear 40 can rotate, the sun gear 29 is held in place and the ring gear 40 is driven in the second direction. Rotation of the ring gear 40 causes a corresponding movement of the planet gears 32 and both the ring gear 40 and planet gears 32 rotate relative to the sun gear 29. This movement of the planet gears 32 causes rotation of the output shaft 18 and a corresponding movement of the shift mechanism of the transmission 14 until the transmission is shifted into park. The sun gear 29 may be held in place by the motor 16 which, while not operating, resists or prevents rotation of the worm 24 to which the sun gear 29 is coupled via the worm gear 27. Of course, a separate lock mechanism may be used to hold the sun gear 29 during the second mode of operation, if desired.

In the implementation shown, the retainer 50 includes a torsion or clutch spring that is coiled around an exterior 51 of the ring gear 40. The spring 50, in at least some implementations, has one fixed leg 52 and one movable leg 54. The fixed leg 52 is attached to or otherwise held immobile by an adjacent structure, which could be a bracket 53 coupled in assembly to the housing 20 or other portion of the actuator 12 or a structure not related to the actuator. The movable leg 54 may be moved relative to the fixed leg 52. In its normal state, without movement of the movable leg 54 relative to the fixed leg 52, the spring 50 provides a friction force that prevents or at least inhibits or limits rotation of the ring gear 40 in the second direction. However, when the movable leg 54 is moved away from the fixed leg 52, the force of the spring 50 on the ring gear 40 is relieved or at least sufficiently reduced to permit rotation of the ring gear 40 in the second direction.

Rotation of the ring gear 40 in the second direction is accomplished by a second drive element 56 which may be any device that can provide a suitable rotational force on the ring gear 40. In the implementation shown, the second drive element is a spring which is called herein a return spring 56. While any suitable spring could be used, the return spring 56 is shown as a torsion spring in the illustrated example. As shown in FIGS. 2 and 3, the return spring 56 has a first end 58 operably coupled to the ring gear 40 (e.g. through coupler 59, described in more detail below) to bias the ring gear 40 for rotation in the second direction. A second end 60 of the return spring 56 bears on a post or anchor 62, which prevents the spring from rotating and may be attached to another structure (e.g. housing 20). Hence, when the ring gear 40 is held against rotation by the retainer 50, the return spring 56 provides a force on the ring gear 40 tending to rotate the ring gear 40 in the second direction. Accordingly, when the force of the retainer 50 on the ring gear 40 is relieved, the return spring 56 rotates the ring gear 40 in the second direction which causes the output shaft 18 to rotate and return the transmission 14 to park.

In at least some implementations, the return spring 56 is positioned offset from the axis 33 and may be coiled about an axis 63 that may be parallel to and radially offset from the axis 33. In the implementation shown, the return spring 56 is positioned laterally offset (e.g. radially spaced from) from the periphery 51 of the ring gear 40. That is, the return spring 56 does not radially overlap the ring gear 40 and is instead radially outboard of the periphery 51 of the ring gear 56. This may reduce the overall or total axial height of the drivetrain 22. Likewise, the motor 16 and worm 24 may also be laterally or radially offset from the drivetrain 22. In at least some implementations, the return spring 56, the motor 16 or both may be positioned axially between an upper surface 64 of the worm gear 27 and a lower surface 66 of the ring gear 40. In other words, the return spring 56, motor 16 or both may be positioned even with or between a first plane 68 (shown in dashed lines in FIG. 3) immediately adjacent to or including the upper surface 64 of the worm gear 27 and a second plane 70 (also shown in dashed lines in FIG. 3) immediately adjacent to or including the lower surface 66 of the ring gear 40. Hence, the overall axial dimension of the actuator assembly 12 may be minimized. In some implementations, the axial dimension may be equal to the axial thickness of the ring gear 40, in other implementations, the axial dimension may be equal to the axial thickness of the ring gear 40 plus the portion of the worm gear 27 that extends axially outwardly from the ring gear 40.

With the return spring 56 offset from the axis 33, the first end 58 of the return spring 56 may be coupled to the ring gear 40 via the coupler 59. In the implementation shown, the coupler 59 is a rigid link (e.g. formed of rigid plastic or metal) having a first portion (e.g. tab 72) engaged by the first end 58 of the return spring 56, and a second portion (e.g. tab 74) coupled to the ring gear 40. As shown, the ring gear 40 includes a cavity 76 and the second tab 74 is received in the cavity 76. The cavity may be defined in a radially outwardly extending flange of the ring gear providing a larger moment arm for the force of the return spring 56 on the ring gear 40, and facilitating an orientation of the return spring force generally tangential to the ring gear (where generally tangential includes angles within 20 degrees of a tangent at the point of connection of the coupler 59 to the ring gear 40). So arranged, the force of the return spring 56 acts on the ring gear 40 through the coupler 59 and tends to rotate the ring gear 40 in a direction that shifts the transmission 14 into park gear. Of course, other connections between the return spring 56 and ring gear 40 may be used, including a direct connection of an end (e.g. end 58) or other portion of the return spring 56 to the ring gear 40. Further, while a rigid link is shown, the coupler 59 could be a cord, cable, rope of the like as, at least when arranged generally as the link is arranged, such a cord or rope would be in tension and operable to transfer force between the return spring and ring gear. In at least some implementations, the coupler 59 is a substantially inextensible member that transfers force between the return spring 56 and the ring gear 40 with little or no lost motion between them. In at least some implementations, while there may be some play or clearance between the connected components due to tolerance, for ease of assembly or otherwise, there is no intentional lost motion provided between the return spring and the ring gear. Of course, other arrangements are possible.

As also shown in FIGS. 2 and 3, a release mechanism 80 is provided to release the ring gear retainer 50 and permit rotation of the ring gear 40. As noted above, the illustrated embodiment of the retainer is a torsion spring 50 that is released by moving the movable leg 54 in a direction tending to unwind the spring 50. To move the movable leg 54, a third drive element 82 is provided which engages and moves the leg 54 as noted. The third drive element 82, in at least one implementation, includes a small electric motor that rotates an actuator 84 to selectively engage and move the movable leg. As shown, the actuator 84 includes a cam lobe 86 that engages and displaces the movable leg 54 when the actuator 84 is rotated. While the motor 82 could directly drive the actuator 84, in the version shown, the motor drives a worm 88 which in turn drives a worm gear 89 of the actuator 68. The motor 82 may be driven by electrical power charged and stored, for example, in one or more batteries, capacitors or other power supply 90 or power/charge storage device. Accordingly, even if electric power in the vehicle is not otherwise functioning, the stored charge in the power supply 90 can be used to drive the release mechanism motor 82.

A third mode of operation may be employed after the second mode of operation is complete and the vehicle transmission 14 has been returned to park. The third mode of operation resets the actuator 12 so that the normal or first mode of operation can again commence when electrical power is restored to the main motor. In more detail, during the recovery or third mode of operation, the ring gear 40 is rotated in the first direction to the position it was in prior to the return to park (that is, the second) mode of operation. This rotation of the ring gear 40 in the first direction also winds the return spring 56 so that the necessary force can again be provided for a subsequent return to park event, if electrical power to the main motor 16 is again lost.

To return the ring gear 40 to its starting position, the output shaft 18 is held against rotation in at least one direction, the ring gear 40 is not locked and the main motor 16 is energized to rotate the sun gear 29. Rotation of the sun gear 29 causes a corresponding rotation of the planet gears 32 which in turn rotate the ring gear 40 back toward its starting position and thereby winds the return spring 56.

The output shaft 18 may be locked by any suitable mechanism during the third mode of operation. In at least some implementations, the vehicle transmission cannot be shifted past park and so the output shaft 18 cannot be further rotated in that direction. With the output shaft 18 held in position, the carrier 36 does not rotate during the third mode of operation. Instead, the planet gears 32 only rotate around their shafts 34. When the main motor 16 is energized to drive the sun gear 29, the rotation of the sun gear 29 is transmitted to the ring gear 40 via the rotating planet gears 32. This returns the ring gear 40 to its starting position (e.g. the position it was in before the second mode of operation), which also winds the return spring 56 as noted above.

After the ring gear 40 is returned to its starting position, the release mechanism 80 can move the cam 86 out of engagement with the movable leg 54 of the ring gear retainer 50. The movable leg 54 returns toward the fixed leg 52 and the retaining force of retainer 50 is again applied to the ring gear 40 to prevent or substantially inhibit the ring gear 40 from rotating. In this way, the actuator components (e.g. motors, drivetrain, output shaft, release mechanism, retainer and locking mechanism) are positioned and arranged to permit future shifting of the transmission 14 in the first mode of operation, as commanded by a vehicle operator under the power of the main motor 16.

While the forms of the invention herein disclosed constitute presently preferred embodiments, many others are possible. It is not intended herein to mention all the possible equivalent forms or ramifications of the invention. For example, while the drivetrain 22 was shown and described as a planetary gear set, other arrangements are possible. Also, while the first input was described as being the sun gear 29, the second input the ring gear 40 and the output the planet gears 32, the gears could be arranged differently so that the different gears define different ones of the inputs and output. It is understood that the terms used herein are merely descriptive, rather than limiting, and that various changes may be made without departing from the spirit or scope of the invention.

The invention claimed is:

1. A gear shift control system, comprising:
a first drive member including an electric motor;
an output shaft coupled to a vehicle transmission and to the first drive member to be driven for rotation by the first drive member;
a planetary gear set coupled to the first drive member and the output shaft, and having three intermeshed gear elements including a ring gear, a sun gear and at least one planet gear, where a first gear element, which is a first one of the intermeshed gear elements, is coupled to the first drive member and is driven for rotation by the first drive member, and a second gear element, which is a second one of the intermeshed gear elements, is coupled to the output shaft for rotation with the output shaft;
a return spring coupled to a third gear element, which is a third one of the intermeshed gear elements and which rotates about an axis, to drive the output shaft through the third gear element and the second gear element, wherein the return spring is radially outboard from and does not radially overlap the third gear element and wherein during a first mode of operation the transmission is shifted between park and other gears by causing the first drive member to rotate the output shaft through the second gear element and the first gear element when a transmission gear shift is desired, and during a second mode of operation, the transmission is shifted to park by the return spring which drives the output shaft through the third gear element and second gear element; and
a coupler having a first portion coupled to the return spring and a second portion coupled to the third gear element to connect the return spring to the third gear element, and wherein the coupler is not connected to anything other than the return spring and the third gear element.

2. The system of claim 1 wherein the return spring is a torsion spring with a first portion fixed against movement and a second portion coupled to the third gear element to provide a force on the third gear element to rotate the third gear element during the second mode of operation, and which also comprises a retainer including another torsion spring coupled to the third gear element to prevent rotation of the third gear element during the first mode of operation and permit rotation of the third gear element during the second mode of operation.

3. The system of claim 2 which also comprises a release mechanism that moves the second portion of the return spring during the second mode of operation.

4. The system of claim 3 which also comprises a power storage device coupled to the release mechanism and which stores a reserve of electrical power that is used to actuate the release mechanism.

5. The system of claim 4 wherein the power storage device includes a capacitor that stores a charge that may be provided to the release mechanism.

6. The system of claim 1 wherein the second portion of the coupler remains coupled to the same portion of the third gear element throughout movement of the third gear element.

7. The system of claim 6 wherein the third gear element includes a radially outwardly extending flange and wherein the second portion is coupled to the flange.

* * * * *